US012624145B2

(12) United States Patent
La Greca et al.

(10) Patent No.: US 12,624,145 B2
(45) Date of Patent: May 12, 2026

---

(54) BINDING COMPOSITION FOR SEVERAL APPLICATIONS

(71) Applicant: STM TECHNOLOGIES S.R.L., Milan (IT)

(72) Inventors: Marco La Greca, Calvenzano (IT); Roberto Massini, Calvenzano (IT)

(73) Assignee: STM TECHNOLOGIES S.R.L., Milan (IT)

( * ) Notice: Subject to any disclaimer, the term of this patent is extended or adjusted under 35 U.S.C. 154(b) by 806 days.

(21) Appl. No.: 17/999,479

(22) PCT Filed: May 24, 2021

(86) PCT No.: PCT/EP2021/063745
§ 371 (c)(1),
(2) Date: Nov. 21, 2022

(87) PCT Pub. No.: WO2021/239650
PCT Pub. Date: Dec. 2, 2021

(65) Prior Publication Data
US 2023/0192935 A1      Jun. 22, 2023

(30) Foreign Application Priority Data
May 25, 2020      (IT) ........................ 102020000012220

(51) Int. Cl.
*C08G 16/02*      (2006.01)
*C03C 25/34*      (2006.01)
*C08G 12/12*      (2006.01)

(52) U.S. Cl.
CPC .......... *C08G 16/0293* (2013.01); *C03C 25/34* (2013.01); *C08G 12/12* (2013.01)

(58) Field of Classification Search
None
See application file for complete search history.

(56) References Cited

U.S. PATENT DOCUMENTS

| | | | |
|---|---|---|---|
| 8,114,210 B2 | 2/2012 | Hampson et al. | |
| 8,552,140 B2 | 10/2013 | Swift | |
| 9,394,431 B2 | 7/2016 | Alavi | |
| 10,435,329 B2 | 10/2019 | Allais et al. | |
| 2010/0301256 A1* | 12/2010 | Hampson | F16L 59/028 106/501.1 |
| 2014/0342627 A1 | 11/2014 | Alavi | |
| 2016/0289258 A1 | 10/2016 | Alavi | |

FOREIGN PATENT DOCUMENTS

| | | |
|---|---|---|
| FR | 3032194 A1 | 8/2016 |
| FR | 3032195 A1 | 8/2016 |
| FR | 3032196 A1 | 8/2016 |
| WO | 2012076462 A1 | 6/2012 |
| WO | 2012172262 A1 | 12/2012 |
| WO | 2013021112 A1 | 2/2013 |
| WO | 2013179323 A1 | 12/2013 |
| WO | 2016120575 A1 | 8/2016 |

OTHER PUBLICATIONS

Hamed Younesi-Kordkheili, et al., "Improving Urea Formaldehyde Resin Properties by Glyoxalated Soda Bagasse Lignin", Eur. J. Wood Prod., vol. 73, pp. 77-85, 2014.

International Search Report and Written Opinion for Corresponding International Application No. PCT/EP2021/063745, 7 pages, Sep. 23, 2021.

* cited by examiner

*Primary Examiner* — Christopher M Rodd

(74) *Attorney, Agent, or Firm* — LUCAS & MERCANTI, LLP

(57) ABSTRACT

The present invention relates to an aqueous binding composition containing a) a reducing sugar; b) ammonium sulphamate and/or sulphamate of an alkaline or alkaline-earth metal; c) a pH-adjusting agent selected from ammonium hydroxide (NH4OH), an organic and/or inorganic ammonium salt and/or an organic amine; and a resin (or pre-condensate) obtained by reaction of a polyaldehyde, a urea compound and at a lignin sulphonate and/or a condensation derivate thereof with a polyaldehyde, the resin being present in a percentage of at least 10% by weight on the dry weight of the composition. The binder may be efficiently used to bind cotton fibres, cellulose fibres, organic tissues, coal dust, natural and artificial inorganic fibres, thereby obtaining products with good mechanical properties.

20 Claims, No Drawings

1

BINDING COMPOSITION FOR SEVERAL APPLICATIONS

CROSS-REFERENCE TO RELATED APPLICATIONS

This application is a 371 of PCT/EP2021/063745, filed May 24, 2021, which claims the benefit of Italian Patent Application No. 102020000012220, filed May 25, 2020.

FIELD OF APPLICATION

In its most general aspect, the present invention relates to an aqueous binding composition (binder) which has several applications.

In particular, the present invention relates to an aqueous binding composition comprising at least one reducing sugar, a sulphamate and a resin (hereinafter also referred to as pre-condensate) obtained by reaction between a polyaldehyde, a urea compound and at least one lignin sulphonate.

BACKGROUND OF THE INVENTION

Mineral fibrous materials, widely used as both thermal and acoustic insulating materials, for example in residential and industrial buildings, are known in the art. Said materials are formed by mineral fibres joined with each other by binding compositions (binders), usually aqueous, which comprise a polymerizing/cross-linking agent, and which are thermosetting and capable of firmly joining the fibres by high-temperature thermal-mechanical treatments. In this regard, the process for preparing said mineral fibrous materials generally comprises a first step of forming so-called "free" (i.e. not joined with each other) mineral fibres, followed by a step of impregnating at high temperature said free fibres with binding compositions which, due to the contact and the high temperatures, polymerize, thereby firmly joining the fibres with each other, giving shape and texture to the finished product.

The binding compositions to be applied onto the mineral fibres are generally in the form of an aqueous solution containing the thermosetting resin and additives such as a cross-linking catalyst for the resin, a silane facilitating the fibre-resin chemical binding, an anti-dust mineral oil, etc.

The binding composition is generally applied onto the fibres by spraying.

The properties of the binding composition depend to a large extent on the characteristics of the resin. With regards to the application, the adhesive composition must be easy to spray and it must be possible to deposit it onto the surface of the fibres so as to efficiently bind them.

Moreover, the resin should be stable for a given time period before being used to form the binding composition, said composition being generally prepared just before using it by mixing the resin and the above mentioned additives.

Regarding the compliance with the regulations in force, the resin must be not polluting, i.e. it must contain—and should generate during the bonding step or later—the minimum possible quantity of compounds which can be harmful to human health or to the environment.

The most commonly used thermosetting resins are phenolic resins of the resole class. In addition to their good cross-linking capability at the temperature of application onto mineral fibres, said resins are relatively inexpensive.

The most common resoles are obtained by condensation of phenol and formaldehyde, in the presence of a base catalyst. These resoles contain a certain proportion of free monomers, in particular formaldehyde, whose presence is undesirable because of its known harmful effects.

It has been long proven that formaldehyde is a dangerous carcinogenic agent. Therefore, resole-based resins are generally treated with urea, which reacts with free formaldehyde, thereby forming phenol-urea-formaldehyde copolymers.

However, it has been observed that, under conditions of temperature of resin cross-linking, the urea-formaldehyde condensates are unstable; they decompose resulting again in formaldehyde and urea, which at least partially degrade in ammonia, and are released into the environment, in particular into the working environment.

Regulations on environment protection have become more and more stringent and force producers of insulating products to find solutions which allow further reduction in the levels of undesirable emissions (volatile compounds), in particular of formaldehyde.

For this purpose, several techniques for reducing emissions of undesirable compounds, in particular formaldehyde, of the binding compositions for mineral fibres as much as possible are known in the art.

For example, application WO 2012076462 and U.S. Pat. No. 8,552,140 describe phenolic-resin-based binding compositions for mineral fibres, to which dextrose or Maillard reagents comprising a carbohydrate and an amine, respectively, as scavenger for formaldehyde, are added. However, binding compositions of said type still release significant levels of formaldehyde.

Moreover, several aqueous binding compositions containing compounds able to polymerize by a Maillard reaction (for a general reference to Maillard reaction see for example GP Ellis et al., *Advances in Carbohydrate Chem*, 1959, pp. 63-134) are known in the art, such as sugars and proteins, or poly- or monocarboxylic acids and an ammonia source, and further comprising different types of polymeric/cross-linking agents.

For example, patent application WO 2013/179323 describes a binding composition comprising at least one monosaccharide and, as a polymerizing/cross-linking agent, an organic salt selected from: ammonium sulphamate or sulphamate of an alkaline or alkaline-earth metal.

The organic resin produced by polymerization of said binding compositions on mineral fibres is highly biocompatible and formaldehyde-free at detectable levels. However, the strength of the binding of said organic resin has not the same efficiency as that provided by phenolic resins. For example, the tensile strength of the finished product is satisfactory but lower than that of an analogous product obtained by using a phenolic resin.

WO 2012/172262 describes a binding composition for mineral fibres comprising at least one oligosaccharide, at least one salt of lignin sulphonic acid and a cross-linking catalyst selected from the phosphorus-containing compounds (in particular phosphates) and sulphates.

The patents US 2014/0342627, US 2016/0289258 and U.S. Pat. No. 9,394,431 relate to binding compositions for mineral fibres comprising a reducing sugar and a cross-linking agent comprising a reaction product between urea and a polycarbonyl compound, in particular glyoxal.

French application FR 3032196 describes a binding composition for mineral fibres comprising at least one ammonium lignin sulphonate, at least one carbonyl compound, including glyoxal, and possible further conventional additives including urea.

The application WO 2013/021112 describes a binding composition for mineral fibres comprising at least one reducing sugar, at least one hydrogenated sugar and a polyfunctional cross-linking agent, such as for example glyoxal, to which urea may be added, wherein the amount of the reducing sugar is 10% to 90% by weight on the total weight of the reducing sugar and the hydrogenated sugar. The composition may further comprise ammonium lignin sulphonate or sodium lignin sulphonate.

Patent application WO 2016/120575 describes a binding composition for mineral fibres comprising an ammonium lignin sulphonate or a salt of lignin sulphonic acid with an alkaline or alkaline-earth metal, and a carbonyl compound, in particular hydroxymethylfurfural. The composition may further contain a polysaccharide, for example starch, and may contain ammonium sulphate when ammonium lignin sulphonate is present.

Binding compositions for mineral fibres similar to that of patent application WO 2016/120575 are described in the patent applications FR 3032194 and FR 3032195 and in the application U.S. Pat. No. 10,435,329.

In light of the above, the main purpose of the present invention is to provide a new binding composition which has an improved binding strength and a finished product obtained by using said new binding composition which does not release formaldehyde so as to comply with more stringent regulations on environment protection and to solve the previous drawbacks mentioned with reference to the prior art.

Another purpose of the present invention is to provide a binding composition as above which has a binding strength comparable to that of phenolic-resin-based binding compositions.

A further purpose of the present invention is to provide a process for the production of a finished product, in particular a fibrous material, starting from free mineral fibres, by using a composition as above having improved characteristics of mechanical strength.

SUMMARY OF THE INVENTION

Said purposes are primarily achieved by a formaldehyde-free aqueous binding composition comprising:

at least one reducing sugar;

ammonium sulphamate and/or sulphamate of an alkaline or alkaline-earth metal;

a pH-adjusting agent selected from the group consisting of ammonium hydroxide ($NH_4OH$), an organic and/or inorganic ammonium salt and/or an organic amine;

a resin (or pre-condensate) obtained by reaction between a polyaldehyde, a urea compound and at least one lignin sulphonate and/or a condensation derivate thereof with a polyaldehyde, said resin being present in a percentage of at least 10% by weight on the dry weight of the composition.

The Applicant surprisingly found that an aqueous binding composition as above has an improved binding strength, comparable with that of aqueous binding compositions based on resole resins, and, at the same time, does not release polluting emissions, in particular formaldehyde, like aqueous binding compositions capable of polymerizing by a Maillard reaction such as those described in patent application WO 2013/179323.

In the use as a binder of mineral fibres such as rock or glass fibers, the aqueous binding composition according to the invention advantageously allows to obtain a fibrous product with improved mechanical properties, in particular with a higher tensile and compressive strength.

Therefore, the above purposes are achieved also with a process for the preparation of a mineral fibrous material which uses an aqueous binding composition as specified above. This process comprises the steps of:

forming free mineral fibres of rocky or glassy material;

applying an aqueous binding composition as specified above to said free mineral fibres, thus forming mineral fibre agglomerates with said binding composition; and subjecting said agglomerates to a thermal treatment at a temperature capable of curing said binding composition, thus obtaining said fibrous material.

The above mentioned purposes are also achieved with a fibrous material based on bonded mineral fibres which can be obtained by a process as specified above.

DETAILED DESCRIPTION

In the present description and in the following claims, "aqueous binding composition" means an aqueous solution obtained by dissolving or dispersing the components of said composition in water, as a potential binding agent (binder) for fibrous material.

By the term "formaldehyde-free", when referred to the binding composition according to the invention, is meant that the binding composition releases 5 ppm or less of formaldehyde, preferably 1 ppm or less of detectable formaldehyde levels, when the same is dried and/or hardened under the conditions of use.

Similarly, by the term "formaldehyde-free", when referred to the finished product (for example fibrous material) obtained by using the composition according to the invention, is meant that the finished product comprises and/or releases 5 ppm or less of formaldehyde, preferably 1 ppm or less of detectable formaldehyde levels, in standard tests simulating its ordinary use.

Unless otherwise specified, percentage of a component in a composition according to the invention means the percentage by weight of said component on the total weight of the components of the composition, considered dry, i.e. in the absence of water (dry composition), of the composition.

For the purpose of the present description and of the following claims, except where otherwise stated, all numbers expressing amounts, quantities, percentages, etc., should be understood as modified in all cases by the term "about". Moreover, all the ranges include any combination of the maximum and minimum points described and include any intermediate range in-between, which may or may not be here specifically listed.

As used in the description and in the attached claims, the singular forms "a", "an" and "the" include the plural referents unless the context clearly dictates otherwise.

The characteristics of the embodiments of the present invention described herein may be combined in any way, thereby even forming further embodiments which are not specifically described but fall within the scope of the present invention.

The composition of the invention may be advantageously used in the preparation of fibrous material, such as for example glass wool or mineral wool. Said fibrous material, typically for the use as a thermal and/or acoustic insulating material, may be prepared by known techniques which involve the initial formation of free glass or rock fibres, followed by impregnation of said fibres with a binding composition (binder), and by subsequent a hot polymerization of the latter to firmly bind the mineral fibres with each other.

As specified above, the aqueous binding composition according to the invention comprises at least one reducing sugar. Preferably, the at least one reducing sugar is present in a total amount (i.e. including all the reducing sugars present in the composition) from 50% to 75%, preferably from 50% and 72%.

The term "reducing sugar" is meant in a conventional sense, in other words it may be any monosaccharide or a polysaccharide bearing a free hemiacetal OH group having a reducing action, in particular in copper-alkaline solutions.

Monosaccharides may be both keto- and aldo-monosaccharides, triose, pentose and/or hexose, having an both L- and D-anomeric configuration, or mixtures thereof. Therefore, examples of employable monosaccharides are: fructose, glucose, galactose, xylose, arabinose, ribose, lyxose, mannose, rhamnose and the like. Said monosaccharides may be purchased and used as such, or they may be obtained by known methods, for example by chemical reduction of disaccharides or polysaccharides in general, such as, inter alia, maltose and the like.

In a preferred embodiment, said monosaccharide is selected from: fructose and glucose (also called dextrose), even more preferably present in an amount between 50% and 75% by weight, preferably between 50% and 72% by weight.

Preferably, the present composition contains at least one or two monosaccharides, of which at least one is preferably glucose. In a preferred embodiment, the present composition comprises at least one aldo-monosaccharide, such as for example glucose, and at least one keto-monosaccharide, such as fructose.

In particular, the presence of at least glucose allows to obtain improved binding properties of the composition and improved properties of stability of the fibrous material.

When present, the two monosaccharides may be used in such an amount that their sum is between 50 and 75%, preferably between 50% and 72% of the weight of the composition. Preferably, the two monosaccharides are in a weight ratio of about 1:1 to each other, or one of the two monosaccharides is present in slight excess, such as for example in a ratio between 1:1.5 and 1:3. In one embodiment, the present composition contains fructose and glucose in a ratio of 1:1.25 and in a total amount between 50% and 75% by weight, preferably between 50% and 72% with respect to the total weight of components, considered dry, i.e. in the absence of water.

The reducing polysaccharide in the binding composition according to the invention is selected from the reducing polysaccharides having a weight average molecular weight lower than 1,000,000, preferably lower than 100,000, more preferably lower than 50,000, advantageously lower than 10,000, and even better higher than 180.

Preferably, the reducing polysaccharide contains at least one glucose unit. Particularly preferred are polysaccharides mainly (more than 50% by weight) consisting of glucose units.

The polysaccharide is treated in acidic environment before use.

The aqueous binding composition according to the invention further comprises a sulphamate, in particular ammonium sulphamate and/or a sulphamate of an alkaline or alkaline-earth metal.

The sulphamate acts as a polymerizing/cross-linking agent, and in particular contributes to the formation of melanoidin derivates, generally by polymerization by a Maillard reaction, with the at least one reducing sugar (for example monosaccharide), during the preparation of the fibrous material. In particular, the Maillard reaction results in the formation of aromatic molecules with high molecular weight or of mixtures of aromatic polymers and/or nitrogen containing polymers (melanoidins), which allow the composition to acquire binding and thermosetting characteristics, which are necessary for the composition to act as a binder for mineral fibres. In particular, said melanoidins may have a carbon:nitrogen ratio and an unsaturation and aromaticity degree which may considerably vary depending on the temperature (for a general reference see Ames et al. The Maillard Browning Reaction, Chemistry and Industry, 1988, 7, 558-561).

Examples of usable sulphamates are selected from: sodium sulphamate, potassium sulphamate, calcium sulphamate and ammonium sulphamate, ammonium sulphamate being preferred (CAS N. 7773-06-0). In particular, ammonium sulphamate, which has general formula $H_2NSO_3$—$NH_4^+$ (CHEBI:81950), is an organic (non-carboxylic) salt which is easy to handle since it has a low toxicity and is not irritating when contacting the skin. It can be prepared, for example, by hydrolysis of the reaction product obtained by treating urea with fuming sulphuric acid or it can be commercially purchased. In the aqueous binding composition according to the invention, ammonium sulphamate and/or the sulphamate of an alkaline or alkaline-earth metal is/are present in a total amount between 8 and 20% by weight, in particular between 8 and 12% by weight.

Advantageously, the use of sulphamate as a component of the composition of the present invention results in polymerization times, during the preparation of mineral fibrous material, which are much shorter compared to the times required using binding compositions of the prior art. In particular, the rate of polymerization of the present composition, determined by measuring the gel-time (for a definition of gel-time see for example U.S. Pat. No. 8,114,210), is considerably higher (by more than 20%) compared to corresponding binding compositions containing for example ammonium sulphate, instead of ammonium sulphamate as a polymerizing/cross-linking agent.

Higher rates of polymerization result in shorter times of preparation of the fibrous material, and also allow to reduce the temperature during the polymerization step to temperatures even lower than 200° C., thereby ensuring experimental conditions which are more advantageous and easier to apply at an industrial level. Moreover, the sulphamate, preferably ammonium sulphamate, is used as a polymerizing/cross-linking agent in the composition of the invention in lower amounts compared to other cross-linking agents, such as for example ammonium sulphate, nevertheless ensuring high yields and excellent properties of mechanical strength of the mineral fibre thereby obtained.

The binding composition according to the invention further comprises a pH-adjusting agent providing amino groups into the final resin, selected from the group consisting of ammonium hydroxide ($NH_4OH$), an organic and/or inorganic ammonium salt and/or an organic amine.

In an embodiment, the pH-adjusting agent is also an ammonia source and is selected from ammonium hydroxide ($NH_4OH$), an organic or inorganic ammonium salt and their combinations.

In this regard, examples of organic ammonium salts which can be used are salts of mono- or polycarboxylic organic acid, preferably selected from: citric acid, tartaric acid, glycolic acid, malic acid and lactic acid. Inorganic ammonium salts which can be used are preferably selected from: ammonium nitrate, ammonium phosphate and ammonium sulphate.

In another embodiment of the invention, the pH-adjusting agent is selected from one or more primary, secondary or tertiary organic amines, possibly having additional functional groups (for example alkanolamines), which are used alone or in combination with ammonium hydroxide and/or ammonium salts in a partial replacement of the same.

Preferably, the organic amine is selected from the group consisting of 2-amino-2-methyl-propanol (AMP), hexamethylenediamine and bis(hexamethylene)triamine.

The use in the binding composition according to the invention of at least one organic amine, in particular of at least one amine as specified above, advantageously allows to further increase cohesion on the fibres of the binding composition.

In the composition according to the invention, the pH-adjusting agent, whether it be ammonium hydroxide, an ammonium salt and/or an organic amine, is present in an amount of at least 7%, preferably between 7% and 10%, so as to adjust the pH of the composition of the invention to values between 6 and 9, preferably between 6 and 8.

At this pH, in fact, a higher rate of polymerization of the present composition during the preparation of the mineral fibrous material was observed.

The binding composition according to the invention further comprises a resin (or pre-condensate) obtained by condensation reaction between a polyaldehyde, a urea compound and at least one lignin sulphonate, said resin being present in a percentage of at least 10%, preferably between 10% and 30% by weight on the dry weight of the composition.

By the term "polyaldehyde" is meant an aldehyde which comprises at least two aldehyde groups. Preferably, the polyaldehyde is a non-polymeric dialdehyde, for example glyoxal, glutaraldehyde, 1,6-hexanedial or 1,4-terephthalic dialdehyde.

In a particularly preferred embodiment, the polyaldehyde is glyoxal.

The urea compound is preferably urea.

The at least one lignin sulphonate used in the binding composition according to the invention consists of at least one salt of lignin sulphonic acid derived from lignin. Lignin sulphonates are by-products deriving from wood processing for the production of paper pulp according to the "sulphite" process which employs a sulphite or a bisulphite. Depending on the nature of the counter ion of the sulphite or bisulphite used, in particular ammonium salts, salts of alkaline or alkaline-earth metals of lignin sulphonic acid are obtained. In the present invention, preferred lignin sulphonate are selected from the group consisting of sodium lignin sulphonate, potassium lignin sulphonate, magnesium lignin sulphonate, calcium lignin sulphonate, ammonium lignin sulphonate and combinations thereof.

Lignin sulphonates are often used as extenders in many binding compositions, in the present case the phenolic groups of lignin sulphonates are reacted with a polyaldehyde to form a pre-condensate resin.

The resin (pre-condensate) may be obtained by reacting a mixture comprising the polyaldehyde, the urea compound and at least one lignin sulphonate in predetermined ratios at a suitable temperature, preferably between 80° C. and 85° C., in particular 80° C., for a sufficient time to substantially complete the reaction.

In the above-mentioned mixture, the amount of polyaldehyde, for example glyoxal, may be preferably between 35% and 65%, the urea compound between 15% and 45% and lignin sulphonate between 5% and 40% by weight on the dry weight of the mixture resulting at the end of the addition of all said components.

The lignin sulphonate component may be added as such or preferably in the form of a derivate obtained by reaction of the same with a polyaldehyde (derivate of lignin sulphonate with polyaldehyde, for example lignin sulphonate glyoxalate). Said derivate of lignin sulphonate may be obtained by reacting a mixture comprising, as percentages on the dry weight, 80-90%, preferably 85-88%, lignin sulphonate and 5-20%, preferably 7-18%, polyaldehyde, at a suitable temperature, for example between 50° C. and 70° C., preferably between 55° C. and 60° C., for a sufficient time to substantially complete the reaction, for example about 8 hours.

In one embodiment, the above-mentioned mixture comprises the above specified components in the following proportions by weight on the dry weight of the mixture resulting at the end of the addition of all said components:

polyaldehyde 40-43%;

urea compound 39-43%:

lignin sulphonate 14-21% wherein polyaldehyde is preferably glyoxal.

In another embodiment, the lignin sulphonate component is added in the form of a derivate with polyaldehyde (for example lignin sulphonate glyoxalate) and said mixture, from which the resin (pre-condensate) is obtained, comprises the following components in the following proportions by weight on the dry weight of the mixture resulting at the end of the addition of all said components:

polyaldehyde, preferably glyoxal 60-62%, urea compound 28-32% derivate of lignin sulphonate 10-16% wherein polyaldehyde is preferably glyoxal.

The components forming the mixture from which the pre-condensate is obtained may be mixed in any order and intermediate reaction products may be envisaged.

For example, in a preferred embodiment, the polyaldehyde may be first mixed with the urea compound and be reacted with the latter to form an intermediate reaction product, then lignin sulphonate is added so as to complete the reaction so that the final resin (pre-condensate) is obtained.

It was surprisingly found that the resin (pre-condensate) obtained as a product of a reaction between a polyaldehyde, a urea compound and at least one lignin sulphonate acts as a cross-linking agent for the reducing sugar in synergy with the sulphamate during hardening of the binding composition for the preparation of the fibrous material by binding to one or more reducing sugars. This enables the binding composition according to the invention to acquire thermosetting characteristics and a capability of binding mineral fibres which may be significantly higher than the binding capability of an analogous binding composition containing sulphamate as a cross-linking agent but not said resin (pre-condensate) and also higher than an analogous binding composition containing said resin (pre-condensate) as a cross-linking agent but not sulphamate.

The composition of the invention may contain further additional components, employed for example to improve its temperature resistance or to further facilitate the process of polymerization of the composition during formation of the mineral fibrous material.

In particular, said possible additional components, which are present individually or mixed with each other, may comprise an acrylic component as described in detail below, mineral oils, generally present as an emulsion in an amount between 5 and 8% by weight, amino-silanes, preferably in an amount between 0.1% and 0.2% by weight, polysiloxanes, preferably in an amount between 0.1% and 0.5% by weight and the like. Said possible additional components may be present both individually or mixed with each other. In particular, in an embodiment of the invention, the acrylic component, present as an additional component as above, is preferably in the form of an emulsion and may be selected from: acrylic resin, preferably having acidic pH (generally between 2 and 4), and a carboxylic polymer mixed with a polyol. In this regard, acrylic resins which can be used are thermosetting aqueous resins, for example selected from Acquaset 600™ (Rohm 86 Hass) and Acrodur® (BASF).

Preferred carboxylic polymers are obtained from acrylic or methacrylic acid.

The polyol is selected for example from: polyethers, polypropylene glycol, polyesters and the like. Preferably, the molecular weight of said acrylic component is between 3,000 and 10,000, preferably between 5,000 and 8,000 Dalton.

When said component is present, it can be used in an amount up to 20% by weight, preferably up to 15% by weight, even more preferably up to 10% of the total weight of the composition in dry condition, i.e. the composition without water. Said addition advantageously allows to increase the binding strength of the composition, with resulting improvement of the mechanical and elastic properties of the glass or rock fibrous material comprising the present composition, for example as regards the spring back after compression of glass fiber felts, generally used as thermoacoustic insulators.

Advantageously, the aqueous binding composition (binder) of the present invention is further characterized in that it is stable in time (even for some days) and that no formation of, for example, mildews, gelling or of decomposition products are observed, while said decomposition products may instead be present in the case of storage of aqueous binding compositions known in the art, and containing other polymerizing/cross-linking agents such as, for example, ammonium sulphate.

In addition, the composition of the invention may be easily prepared using water as a solvent and by a process which is easy to apply even at an industrial level. The present composition, in fact, which is prepared without using possible formaldehyde sources, may be obtained by simply mixing the above-described components, with water, in short times.

Generally, water is used in a just sufficient amount to dissolve the components of the composition and/or to obtain aqueous solutions with defined concentrations.

In other words, the binding composition according to the invention useful in the preparation of mineral fibrous material may be obtained by dissolving in water:
    at least one reducing sugar;
    ammonium sulphamate and/or sulphamate of an alkaline or alkaline-earth metal;
    a pH-adjusting agent selected from the group consisting of ammonium hydroxide ($NH_4OH$), an organic and/or inorganic ammonium salt and/or an organic amine;
    a resin (or pre-condensate) obtained by reaction between a polyaldehyde, a urea compound and at least one lignin sulphonate; and
    possible additional components,
in the weight percentages according to each embodiment as above.

In this regard, the binding composition (binder) according to the invention in the form of an aqueous solution may have preferably a weight concentration at the time of application onto the fibres between 5 and 30%, more preferably between 5 and 20%, even more preferably between 5% and 15%, which is to be understood as the weight of all the components in relation to the total weight of the solution.

In one embodiment, the present aqueous binding composition (binder) may be prepared by mixing at room temperature (i.e. at a temperature between 15° C. and 40° C.) the desired amounts of the single components, generally in a mixing tank, followed by simple water addition, in a just sufficient amount to obtain the preferred concentration values.

In another embodiment, the binding composition according to the invention may be prepared by mixing an aqueous solution containing the at least one reducing sugar, ammonium sulphamate and/or sulphamate of an alkaline or alkaline-earth metal, a pH-adjusting agent as specified above and possible additional components, with the resin (pre-condensate) and possibly additional water in a just sufficient amount to obtain the preferred concentration values.

In a further embodiment, the binding composition according to the invention may be obtained by first preparing an aqueous solution containing the at least one reducing sugar, ammonium sulphamate and/or sulphamate of an alkaline or alkaline-earth metal, ammonium hydroxide and/or organic and/or inorganic ammonium salt, then heating said aqueous solution to a temperature between 50° C. and 90° C., in particular 70° C. for a time period of at least 20 minutes, preferably between 20 and 25 minutes, and then adding to said solution, after cooling, at least one organic amine preferably selected from those specified above, the resin (pre-condensate) and possibly additional water in a just sufficient amount to obtain the preferred concentration values.

All the components of the binding composition of the invention are easily commercially available and purchasable and many of them, such as the reducing sugar and urea, have natural origin.

In a further aspect, the invention refers to the use of the present binding composition in the preparation of glass or rock mineral fibres.

In this aspect, the present invention refers to a fibrous material comprising mineral fibres, preferably from glass or rock, joined together by using the present aqueous binding composition (binder). A further object of the present invention is thus a mineral fibrous material obtained from free mineral fibres by a process comprising at least one step pf polymerization of the binding composition of the invention, at such a temperature to harden and polymerize the binding composition.

In this regard, said mineral fibrous material may be advantageously prepared using a process comprising the steps of:
    forming free fibres, preferably by melting glassy (such as for example alkaline borosilicate mixtures) or rocky (such as for example basalt, dolomite, slag and limestone mixtures) material;
    applying an aqueous binding composition as specified above to said free mineral fibres, thus forming mineral fibre agglomerates with the binding composition of the invention, preferably by spraying said composition onto the free fibres; and
    subjecting said agglomerates to a thermal treatment at a temperature capable of hardening and polymerizing the binding composition.

The latter thermal treatment occurs at a temperature of at least 180° C., preferably at a temperature between 180° C. and 250° C. and, more preferably, between 180° C. and 220°

C., typically in polymerization stoves, and triggers the process of polymerization of the binding composition of the invention, which stably binds to the fibres, thus forming the final fibrous material, ready for use. Said thermal treatment may occur by using hot air circulating in the stove by means of variable-pressure fans, for a time period varying depending on the stove speed, for example depending on the weight per surface units of the final product.

If necessary, the step of thermal treatment for the polymerization/hardening of the binding composition is preceded by a step of orientation (or "crimping") of the fibres which allows to orient the fibres in a vertical position, thereby increasing their compressive strength.

The step of application of the binding composition onto the free fibres is preferably performed by impregnation, in particular by spraying the aqueous composition of the invention onto the free fibres just hot formed, by using equipments known in the art and commonly used in the preparation of mineral fibrous material. The amount of binder applied onto the free mineral fibers can vary to a large extent so as to obtain a mineral fibrous material with a desired solid binder content. For example, in the case of glass wool fibrous materials, the solid binder content can be comprised between 5% and 20% while in the case of stone wool fibrous materials, the solid binder content can be comprised between 1.5% and 10%. When the application step is finished, mineral fibre agglomerates are obtained with the binding composition of the invention, which typically have parallelepiped section, in the form of rolled panels or felts.

Similarly, the step of formation of the free fibres (commonly known as fiberizing process) may advantageously occur by operations which are known to the skilled in the art and comprise melting of starting glassy or rocky material, followed by passing through an extrusion die connected to a rotor (spinner) provided with thousands of holes which, by rotating at high speed, throws out very thin (glass) fibre filaments, which are ready to be contacted with the binding composition according to the application step as above. In the case of rock fibre, it is supplied, in the form of high-temperature lava, to wheels that, by rotating at high speed, provide the centrifugal force required for thinning into fibres, which are also ready to be immediately contacted with the aqueous binder.

Once the final fibrous material has been cut to the required sizes, it may be packaged and used as a thermal and/or acoustic insulator, further showing excellent properties of mechanical strength, of heat resistance and of spring back, which is to be understood as the difference between the nominal thickness of the material before and after its packaging. Thus, in an additional aspect, the invention refers to a mineral fibrous material which can be obtained by a process as described above.

With the process disclosed above using the binding composition according to the invention, glass wool fibrous materials and rock wool fibrous materials may be prepared having one or more of the properties as indicated below.

Glass Wool Fibrous Materials:
  density from 6 to 110 kg/m$^3$;
  solid binder content from 5 to 20%
  parting strength of at least 100 gf/f according to the standard ASTM C 685-90;
  at least 100% thickness recovery after compression for rolled blankets packed under pressure (compression ratio more than 4.5) as determined by thickness measure according to UNI:EN 823:2013; and
  at least 100% thickness recovery after compression for boards packed under pressure as determined by thickness measure according to UNI:EN 823:2013; the compression rate depends from the board density (higher density less compression).

Rock (Stone) Wool Fibrous Materials:
  density from 20 to 250 kg/m$^3$;
  solid binder content from 1.5 to 20%
  at least 60 kPa at the compression test according to the standard UNI EN 826:2013
  at least 100% thickness recovery after compression as determined by thickness measure according to UNI:EN 823:2013.

Further characteristics and advantages of the present invention will appear more clearly from the following examples, provided by way of non-limiting illustration.

EXPERIMENTAL PART

Example 1: Preparation of a Resin
(Pre-Condensate)

A resin (pre-condensate) for the use in the preparation of a binding composition according to the invention was prepared as follows.

150 parts by weight of a 40 wt % glyoxal solution were mixed with 20 parts by weight of calcium lignin sulphonate and 60 parts by weight of urea at room temperature under agitation until dissolution of the above-mentioned components.

The resulting mixture was poured into a reactor provided with reflux system and agitator, was heated to 80° C. and was kept at said temperature under vigorous agitation for 2 hours.

When the reaction is finished, a resin is obtained as a product of the reaction of the above-mentioned components in aqueous solution having pH of about 7.

Example 2: Preparation of a Resin
(Pre-Condensate)

A resin (pre-condensate) for the use in the preparation of a binding composition according to the invention was prepared as follows.

186 g of a 40 wt % glyoxal solution are mixed with 71 g of urea at room temperature under agitation until dissolution of the above-mentioned components.

The resulting mixture was poured into a reactor provided with reflux system and agitator, was heated to 80° C. and was kept at said temperature under agitation for 1 hour.

After this time period, 38 g calcium lignin sulphonate were added into the reactor and the mixture was kept at 80° C. for an additional hour.

When the reaction is finished, a resin is obtained as a product of the reaction of the above-mentioned components in aqueous solution having pH of about 7.

Example 3: Preparation of a Resin
(Pre-Condensate)

A resin (pre-condensate) for the use in the preparation of a binding composition according to the invention was prepared as follows starting from a lignin sulphonate glyoxalate.

81 g calcium lignin sulphonate were mixed with 132 g water and 14 g of a 30% sodium hydroxide solution under agitation until dissolution of the above-mentioned components. It was then added more of the 30% sodium hydroxide solution in a just sufficient amount to bring the pH to 12.

The resulting mixture was poured into a reactor provided with reflux system and agitator, to which 17 g of a 40% glyoxal solution were added. The mixture was then heated to 58° C. and kept under agitation at said temperature for about 8 hours, thereby obtaining a condensation product containing calcium lignin sulphonate glyoxalate at 37.5% by weight on the dry weight.

210 g of a 40 wt % glyoxal solution are mixed with 40 g of urea at room temperature under agitation until dissolution of the above-mentioned components and the pH of the resulting mixture was brought to about 4.5 by adding a just sufficient amount of a 30% sodium hydroxide solution.

The resulting mixture was poured into a reactor provided with reflux system and agitator, was heated to 75° C. and was kept at said temperature under agitation for 2 hours.

After this time period, 40 g of the condensation product containing 37.5% calcium lignin sulphonate glyoxalate were added into the reactor and the mixture was kept at 75° C. for an additional hour.

When the reaction is finished, a resin is obtained as a product of the reaction of the above-mentioned components in aqueous solution having pH of about 7.5.

Example 4: Preparation of Binding Compositions According to the Invention

Binding compositions according to the invention were prepared as follows.

78 g glucose (dextrose) were mixed with 325 g water and 12.5 g ammonium sulphamate, and ammonium hydroxide and/or an organic or inorganic ammonium salt were/was added until a final pH of 7.5-8 was obtained.

The resulting solution, hereinafter solution 1, was mixed at room temperature with one of the resins (pre-condensates) of Examples 1-3 in proportions on the dry weight of 10-30% as regards the resin and 70-90% as regards solution 1, thereby obtaining binding compositions as those showed in the following Table 1.

TABLE 1

|  | Solution 1 % (dry weight) | Resin Ex. 1 % dry weight | Resin Ex. 2 % dry weight | Resin Ex. 3 % dry weight |
|---|---|---|---|---|
| Binding composition A | 70-90% | 10-30% |  |  |
| Binding composition B | 70-90% |  | 10-30% |  |
| Binding composition C | 70-90% |  |  | 10-30% |

Example 5: Preparation of Binding Compositions According to the Invention

Binding compositions according to the invention were prepared as follows.

78 g glucose (dextrose) were mixed with 325 g water, 12.5 g ammonium sulphamate, and ammonium hydroxide and/or an organic or inorganic ammonium salt were/was added, final pH 7.5-8, the resulting solution was heated to 70° C. for at least 20 minutes. After cooling, 8 g hexamethylenediamine were added, final pH about 8.

The resulting solution, hereinafter solution 2, was mixed with one of the resins (pre-condensates) of Examples 1-3 in proportions on the dry weight of 10-30% as regards the resin and 70-90% as regards solution 2, thereby obtaining binding compositions as those showed in the following Table 2.

TABLE 2

|  | Solution 2 % (dry weight) | Resin Ex. 1 % dry weight | Resin Ex. 2 % dry weight | Resin Ex. 3 % dry weight |
|---|---|---|---|---|
| Binding composition D | 70-90% | 10-30% |  |  |
| Binding composition E | 70-90% |  | 10-30% |  |
| Binding composition F | 70-90% |  |  | 10-30% |

Example 6 (Comparative): Preparation of a Binding Composition Without Resin (Pre-Condensate)

A binding composition not according to the invention (comparative) was prepared by mixing 78 g glucose (dextrose) with 325 g water and 12.5 g ammonium sulphamate, and ammonium hydroxide and/or an organic ammonium salt were/was added, final pH 7.5-8.

The resulting solution was used directly, i.e. without mixing with the resin (pre-condensate) as binding composition which is hereinafter referred to as comparative binding composition G.

Example 7 (Comparative): Preparation of a Binding Composition Without Sulphamate A binding composition not according to the invention (comparative) was prepared as follows.

78 g glucose (dextrose) were mixed with 325 g water, and ammonium hydroxide and/or an organic or inorganic ammonium salt were/was added, final pH 7.5-8.

The resulting solution was mixed at room temperature with a resin (pre-condensate) obtained according to Example 1 in proportions on the dry weight of 10-30% as regards the resin and 70-90% as regards solution, thereby obtaining binding compositions hereinafter collectively referred to as comparative binding composition H.

Example 8: Preparation of Fibrous Materials with Binding Compositions According to the Invention and Comparative Binding Compositions The binding compositions of examples 5 to 7, and also a commercial resole resin (formaldehyde-phenol-urea) (DYNEA Prefere 72-5235) as a reference, were used to form glass-wool-based insulating products.

Glass wool was produced by the technique of internal centrifugation wherein the composition of melted glass is converted into fibres by a rotor called "spinner" operating a high speed of rotation, the rotor being provided with an external band (or disc) provided with a plurality of small orifices. Due to the centrifugal force, the melted material is thrown against the perforated peripheral band from which primary filaments of melted mineral material come out through the orifices, said filaments, in turn, being drawn to form thin fibres thanks to the action of a high-temperature gas coming from an annular burner which surrounds the disc.

The binding composition was applied to the thin fibres so obtained exiting the rotor by means of an annular spray nozzle placed under the rotor so as to evenly distribute the binding composition onto the fibres and to obtain fibre agglomerates ("mats") impregnated with the binding composition.

Said agglomerates were collected onto a conveyor belt and sent to a furnace kept at a temperature of at least 180° C., where they remained for a sufficient time to allow the polymerization (hardening) of the composition and the binding with the fibres, thereby obtaining fibrous materials of a substantially parallelepiped shape.

The mechanical properties of said fibrous materials, with reference to the tensile strength, were measured according to standard ASTM C 685-90 "Parting Strength of Mineral Fiber Batt—and Blaket-Type Insulation" by measuring the breaking load (as gram-force "gf") and calculating the tensile strength as "parting strength" as gram-force per sample gram according to the above ASTM standard. The specimens subjected to the test have substantially the same fibre diameter, the same density and approximately the same content of binder.

The results are summarized in the following Table 3.

TABLE 3

| Binding composition | Tensile strength (gf/g) |
|---|---|
| A (according to the invention) | 160-180 |
| B (according to the invention) | 160-180 |
| C (according to the invention) | 150-200 |
| D (according to the invention) | 140-190 |
| E (according to the invention) | 170-200 |
| F (according to the invention) | 210-240 |
| G (comparative without resin) | 110-130 |
| H (comparative without sulphamate) | 110-130 |
| Reference (phenolic resin) | 220-250 |

From the above Table 3, it can be appreciated that all fibrous materials obtained using exemplified binding compositions according to the invention have better properties of mechanical strength, which are better than those of fibrous materials obtained using a sulphamate-free binding composition (comparative composition H) and better than those of fibrous materials obtained using a resin-free binding composition (comparative composition G).

In addition, the fibrous materials obtained using binding compositions C and F, wherein the lignin sulphonate is pre-reacted with polyaldehyde and composition E containing hexamethylenediamine have the best properties of mechanical strength of the binding compositions according to the invention used in the above tests. Concerning this point, for the fibrous materials obtained using binding compositions C, E and F, a content of resin (pre-condensate) in the binding composition of 10% is sufficient to obtain excellent properties of mechanical strength.

Moreover, the exemplified binding compositions according to the invention have properties of mechanical strength substantially comparable to those of the reference phenolic resin but, unlike the latter, they do not contain nor release formaldehyde.

The invention claimed is:

1. A formaldehyde-free aqueous binding composition comprising:
   a reducing sugar;
   ammonium sulphamate and/or a sulphamate of an alkaline or alkaline-earth metal;
   a pH-adjusting agent selected from the group consisting of ammonium hydroxide ($NH_4OH$), an organic and/or inorganic ammonium salt and/or an organic amine; and
   a resin (pre-condensate) obtained by reaction of a polyaldehyde, an urea compound and a lignin sulphonate and/or a condensation derivate thereof with a polyaldehyde, said resin being present in a percentage of at least 10% by weight on the dry weight of the composition.

2. The binding composition according to claim 1, wherein the reducing sugar is present in a total amount of from 50% to 75%.

3. The binding composition according to claim 1, wherein the ammonium sulphamate and/or sulphamate of an alkaline or alkaline-earth metal, is/are present in a total amount of between 8 and 20% by weight, the sulphamate of an alkaline or alkaline-earth metal being sodium sulphamate, potassium sulphamate or calcium sulphamate.

4. The binding composition according to claim 1, wherein said pH-adjusting agent is present in an amount of at least 7%, to adjust the pH to values of between 6 and 9.

5. The binding composition according to claim 1, wherein said organic ammonium salt is the ammonium salt of an acid selected from the group consisting of citric acid, tartaric acid, glycolic acid, malic acid and lactic acid.

6. The binding composition according to claim 1, wherein said organic amine is selected from the group consisting of 2-amino-2-methyl-propanol (AMP), hexamethylenediamine and bis(hexamethylene)triamine.

7. The binding composition according to claim 1, wherein said resin (pre-condensate) is present in a percentage between 10% and 30% by weight on the dry weight of the composition.

8. The binding composition according to claim 1, wherein said polyaldehyde is a non-polymeric dialdehyde, said urea compound is urea and said lignin sulphonate is selected from ammonium salts or salts of alkaline or alkaline-earth metals with lignin sulphonic acid.

9. The binding composition according to claim 1, wherein said resin is obtained by reacting a mixture comprising from 35% to 65% of polyaldehyde, from 15% to 45% of urea compound and from 5% to 40% of a lignin sulphonate and/or a condensation derivate thereof with a polyaldehyde, wherein the percentages are by weight on the dry weight of the mixture resulting at the end of the addition of all the said components, at a temperature of between 60° C. and 100° C., for a time sufficient to substantially complete the reaction.

10. The binding composition according to claim 1, wherein said condensation derivate is obtained by reacting said lignin sulphonate with a polyaldehyde at a temperature of between 50° C. and 70° C.

11. The binding composition according to claim 1, further comprising 5-8% of a mineral oil, 0.1-0.2% of an aminosilane, 0.1-0.5% of polysiloxanes or mixtures thereof.

12. The binding composition according to claim 1, further comprising an acrylic component having molecular weight of between 3,000 and 10,000.

13. A process for preparing a fibrous material starting from free mineral fibres, said process comprising the steps of:
   forming free mineral fibres of rocky or glassy material;
   applying an aqueous binding composition according to claim 1 to said free mineral fibres, thus forming mineral fibre agglomerates with said binding composition; and
   subjecting said agglomerates to a thermal treatment at a temperature capable of hardening said binding composition, thus obtaining said fibrous material.

14. The process according to claim 13, wherein the thermal treatment occurs at a temperature of at least 180° C.

15. A mineral fibrous material obtained by the process according to the claim 13.

16. The mineral fibrous material according to claim 15, which is a glass wool fibrous material having one or more of the following properties:

density from 6 to 110 kg/m$^3$;

solid binder content from 5 to 20% parting strength of at least 100 gf/f according to the standard ASTM C 685-90;

at least 100% thickness recovery after compression for rolled blankets packed under pressure (compression ratio more than 4.5) as determined by thickness measure according to UNI:EN 823:2013; and at least 100% thickness recovery after compression for boards packed under pressure as determined by thickness measure according to UNI:EN 823:2013.

17. The mineral fibrous material according to claim 15, which is a rock wool fibrous material having one or more of the following properties:

density from 20 to 250 kg/m$^3$;

solid binder content from 1.5 to 20% at least 60 kPa at the compression test according to the standard UNI EN 826:2013; and at least 100% thickness recovery after compression as determined by thickness measure according to UNI:EN 823:2013.

18. The binding composition according to claim 2, wherein the reducing sugar is selected from the group consisting of monosaccharides glucose, fructose, galactose, xylose, arabinose, ribose, lyxose, mannose and rhamnose.

19. The binding composition according to claim 1, wherein the reducing sugar is a polysaccharide having a weight average molecular weight lower than 1,000,000, and said polysaccharide being used after acid treatment.

20. The binding composition according to claim 8, wherein the non-polymeric dialdehyde is glyoxal, glutaraldehyde, 1,6-hexanedial or 1,4-terephthalic dialdehyde and the lignin sulphonate is selected from sodium lignin sulphonate, potassium lignin sulphonate, magnesium lignin sulphonate, calcium lignin sulphonate, ammonium lignin sulphonate and combinations thereof.

\* \* \* \* \*